(No Model.) 5 Sheets—Sheet 1.

F. F. RAYMOND, 2d.
MACHINE FOR MAKING, DISTRIBUTING, AND DRIVING NAILS.

No. 381,280. Patented Apr. 17, 1888.

(No Model.) 5 Sheets—Sheet 3.

F. F. RAYMOND, 2d.
MACHINE FOR MAKING, DISTRIBUTING, AND DRIVING NAILS.

No. 381,280. Patented Apr. 17, 1888.

WITNESSES.
J. M. Dolan
E. P. Small.

INVENTOR.
F. F. Raymond (No Model.)  F. F. RAYMOND, 2d.  5 Sheets—Sheet 4.
MACHINE FOR MAKING, DISTRIBUTING, AND DRIVING NAILS.

No. 381,280.  Patented Apr. 17, 1888.

WITNESSES.
J. M. Dolan.
J. P. Small.

INVENTOR.
F. F. Raymond 2d (No Model.) 5 Sheets—Sheet 5.

F. F. RAYMOND, 2d.
MACHINE FOR MAKING, DISTRIBUTING, AND DRIVING NAILS.

No. 381,280. Patented Apr. 17, 1888.

WITNESSES.
J. M. Dolan.
E. P. Small.

INVENTOR.
F. F. Raymond

UNITED STATES PATENT OFFICE.

FREEBORN F. RAYMOND, 2D, OF NEWTON, MASSACHUSETTS.

MACHINE FOR MAKING, DISTRIBUTING, AND DRIVING NAILS.

SPECIFICATION forming part of Letters Patent No. 381,280, dated April 17, 1888.

Application filed December 9, 1887. Serial No. 257,367. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nail-Making, Distributing, and Driving Machines, of which the following is a full, clear, and exact description, reference being had to the accompanying drawings, forming a part of this specification, in explaining its nature.

The object of the invention is to provide for making, distributing, and delivering nails to nail-driving devices in large numbers and rapidly, and it comprises a series of devices for simultaneously or substantially simultaneously feeding a number of continuous wires to nail-forming devices, nail-forming devices which form nails thereon, or on blanks severed therefrom, and a movable receiving-block for receiving the nails simultaneously or substantially simultaneously after they are made and for delivering them to the distributer; also, to the combination of these devices or elements or each of them with the distributor; also, to the combination of nail making and distributing devices with a nail-carrier and with nail-driving devices.

It also relates to various details of organization and construction, all of which will be hereinafter described.

Figure 1:
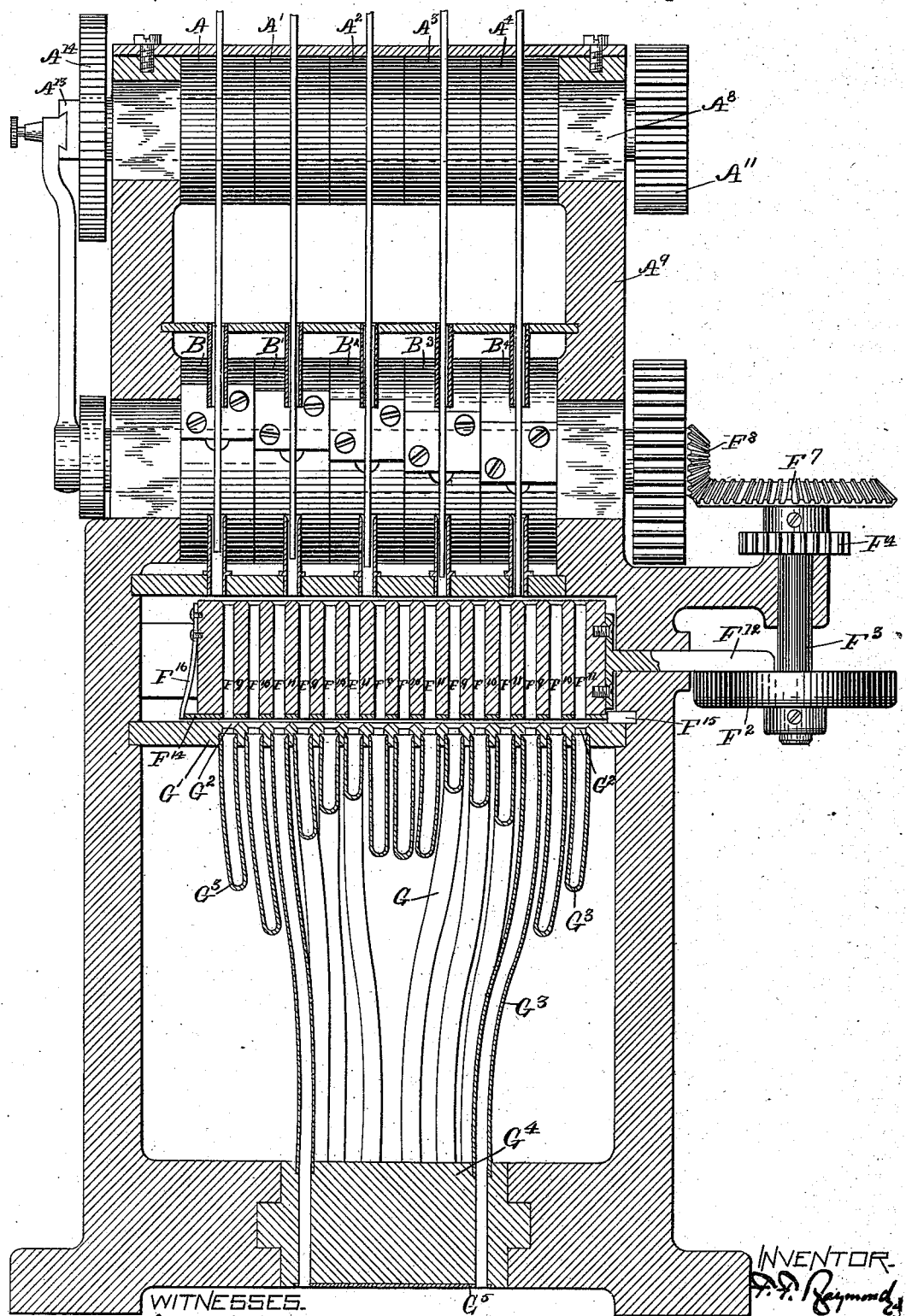
Figure 2:
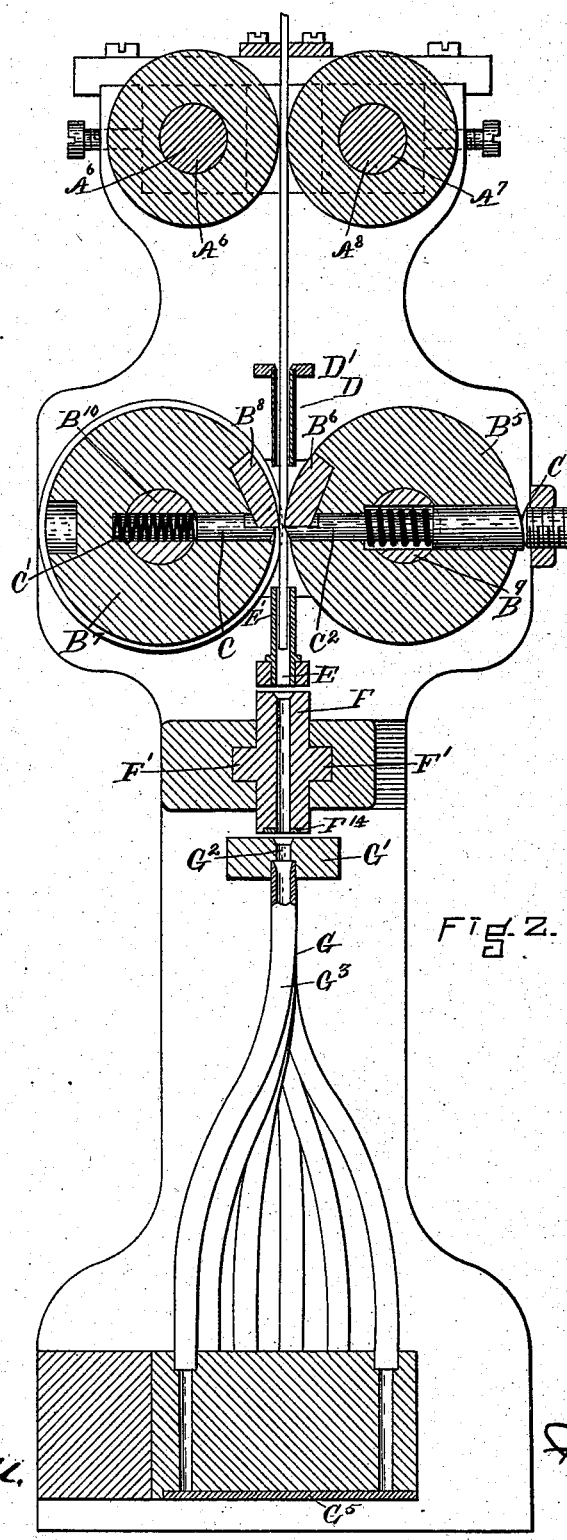
Figure 3:
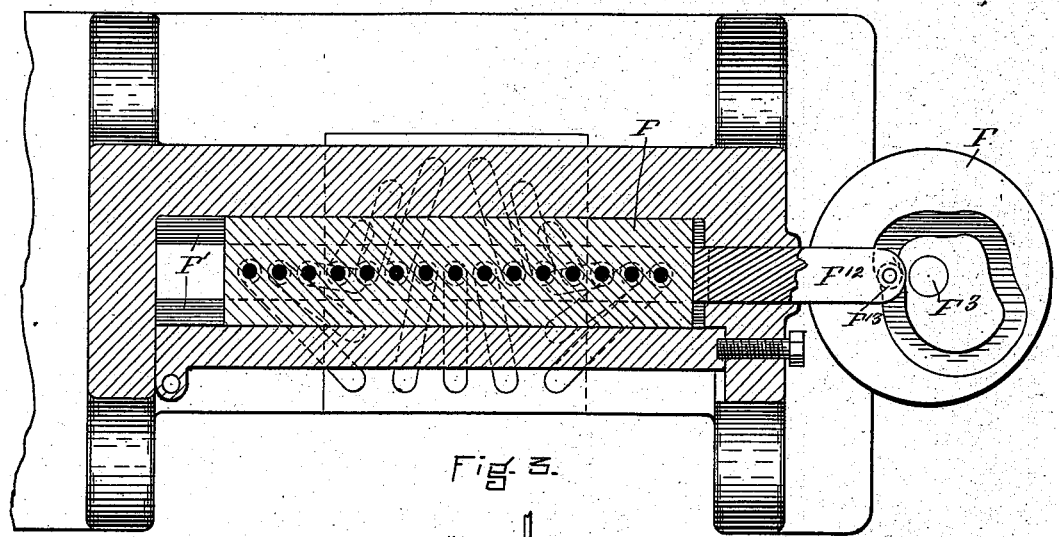
Figure 4:
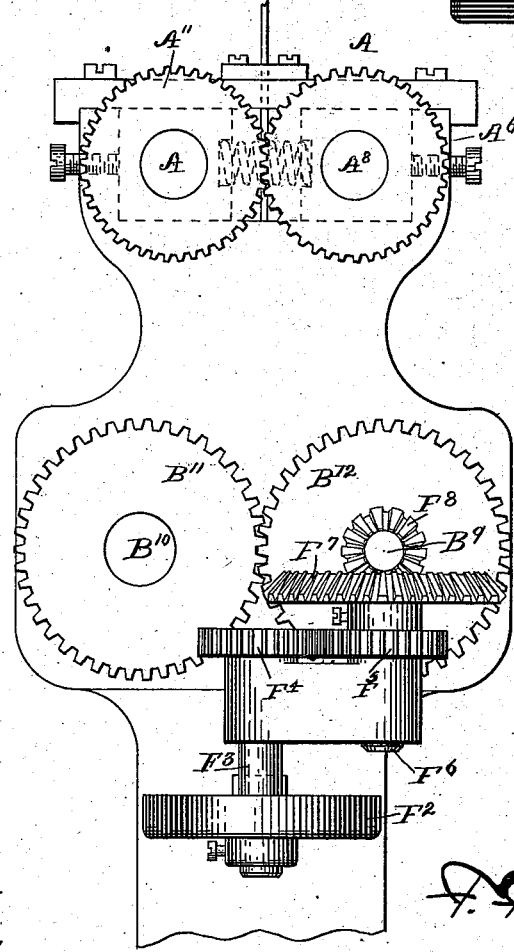
Figure 5:
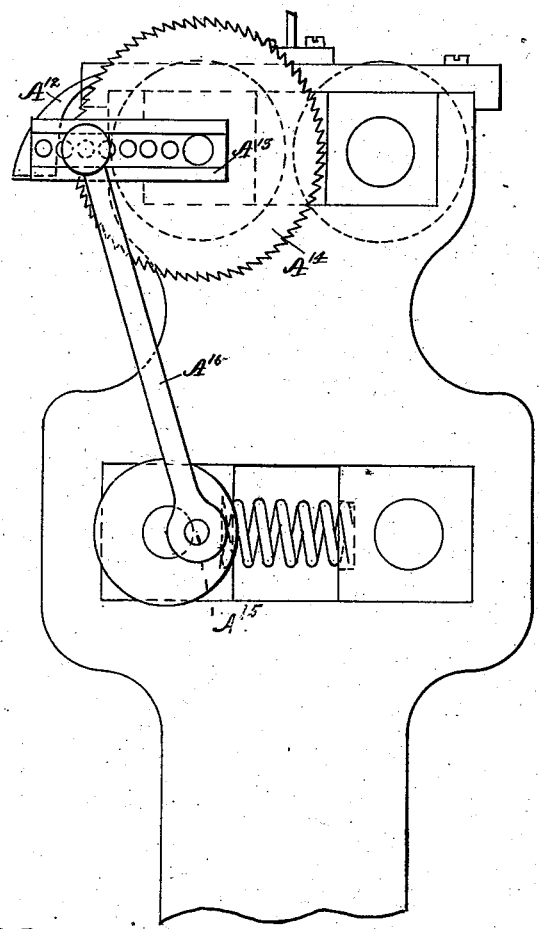
Figure 6:
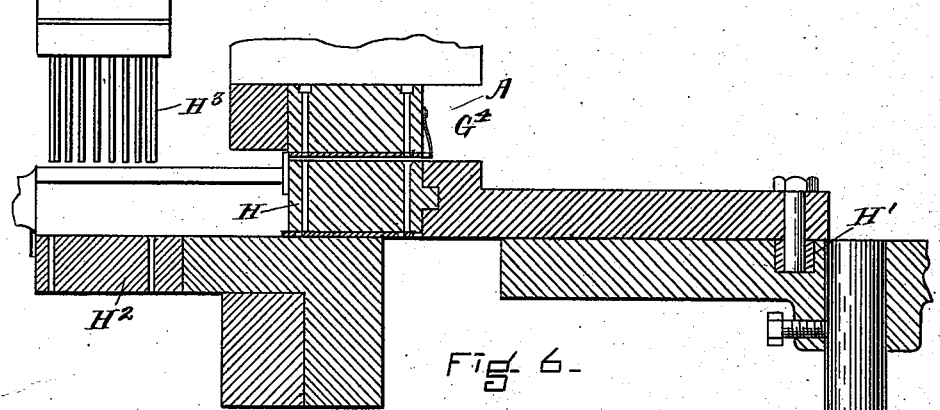
Figure 7:
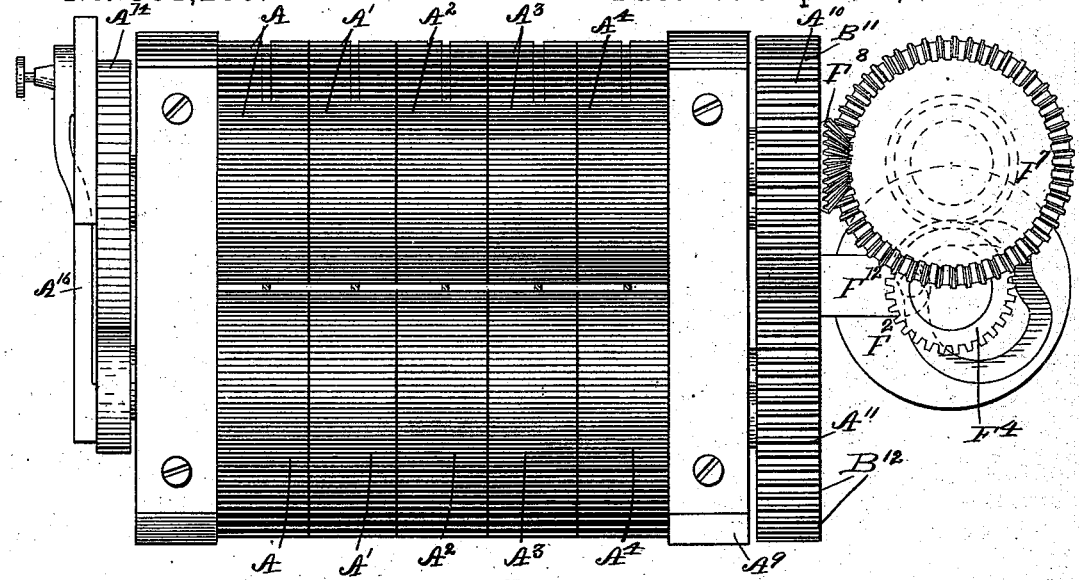
Figure 8:
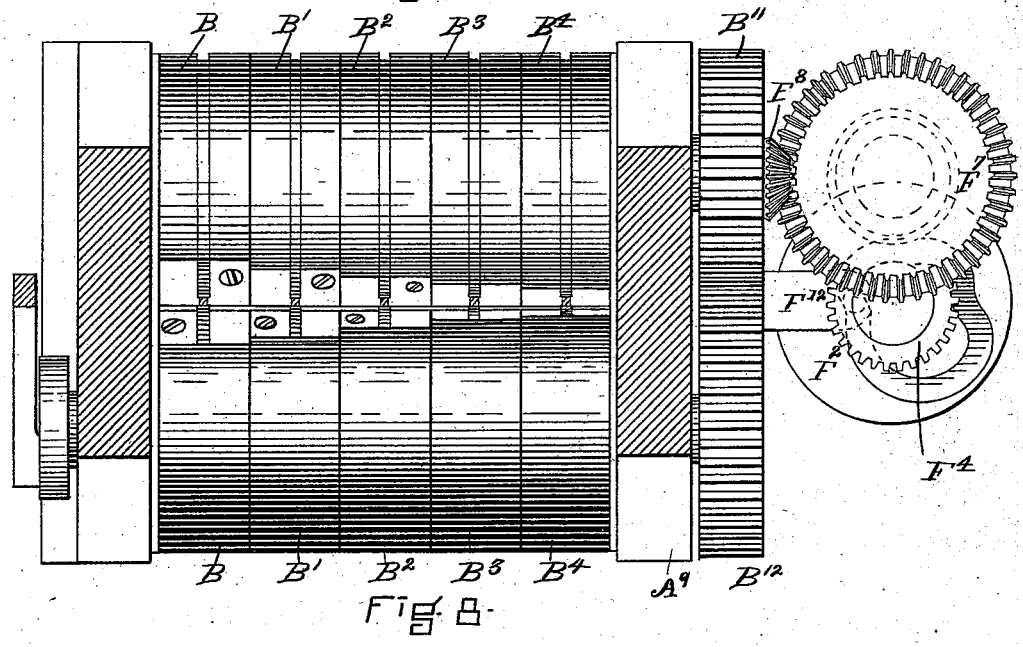

In the drawings, Figure 1 is a view, principally in vertical central section of a machine having the features of my invention. Fig. 2 is a view in vertical central section at right angle to that shown in Fig. 1. Fig. 3 is a view in horizontal section taken through the nail-receiving block and in plan of the cam for operating it. Fig. 4 is a view in elevation of one side of the central and upper parts of the machine. Fig. 5 is a view in elevation of the central and upper parts of the other side of the machine. Fig. 6 is a view illustrating the relation of the distributer to the nail carrier and driving devices. Fig. 7 is a plan view of the feed-rolls of the machine. Fig. 8 is a plan view of the point-forming and nail-severing rolls.

The invention is in some respects an improvement upon that described in the application for patent of Chester C. Small for nail making and distributing machines, Serial No. 235,648, filed April 21, 1887, and upon that described in my Patent No. 371,851.

In the drawings, A A′ A² A³ A⁴ represent a series of wire-feeding devices, each of which is adapted to feed a separate wire, and in this case each feeding device comprises a roll, A⁵, mounted upon the common shaft A⁶, and the roll A⁷, mounted upon the common shaft A⁸.
These feed-rolls have roughened or corrugated surfaces. Shafts A⁶ A⁸ are supported by suitable bearings in the frame A⁹, and are connected by the gears A¹⁰ A¹¹. (Shown only at one end of the shafts, but which may be at each end, and, if desired, at the center of their length.) The shafts may also have bearings at the center of their length. The shafts are intermittingly rotated by means of the pawl A¹², carried by the lever A¹³, which pawl meshes with a ratchet-wheel, A¹⁴, on the shaft A⁸. This pawl-carrying lever A¹³ is oscillated or moved intermittingly at the desired time by means of a cam or crank, A¹⁵, upon one of the roll-shafts, and a connecting-rod, A¹⁶, the upper end of which is adapted to be adjusted upon the end of the lever A¹³ in relation to its fulcrum to vary the throw of the feed-pawl.

Beneath the feed-rolls are a series of nail-making devices, B B′ B² B³ B⁴. Each of these nail-making devices is adapted to make nails from a single wire which is fed to it by its respective wire-feeding device. The nail-making devices in the form of invention illustrated comprise a roll, B⁵, having a male section, B⁶, of a pointing-die, and a roll, B⁷, having a box or female section, B⁸, of the pointing-die. The rolls B⁵ are mounted upon a common shaft, B⁹. The rolls B⁷ are mounted upon a common shaft, B¹⁰, and both the shafts B⁹ and B¹⁰ have suitable bearings in the frame. The male and female sections of the pointing-dies are like those described in the said Small application, and the rolls in every other material respect act upon the wires to form the nails as described in said application. The pointing-rolls also have a nail-severing device similar to that described in said application, and comprises the anvil C, preferably movable radially in the roll B⁷ in opposition to the spring C′, and arranged so that its face is immediately below the end of the female member B⁸ of the pointing-die and the cut-off C², which is also carried in a hole in the roll B⁵ and has its operating end immediately below the end of the male die, and it is moved outward by means of a cam or projection, $C^3$, to sever a pointed section of the wire from the remainder of the wire. The shafts $B^9$ $B^{10}$ are geared together by the gears $B^{11}$ $B^{12}$.

A plate, D, having guiding throats or passageways D', is arranged below the feed-rolls. Below the meeting-point of the dies of each set of rolls there is a throat or passage, E, formed in a tube or block, E', which provides each nail-forming device with a passage through which the nails which it forms are delivered to the nail-receiving block F. This block F is mounted in the ways F', to be moved horizontally, and it is actuated by means of the cam $F^2$ upon the shaft $F^3$, which is connected by the gears $F^4$ $F^5$ with a short shaft, $F^6$, having the bevel-gear $F^7$, which engages bevel-gear $F^8$ on one of the shafts, $B^9$, so that the cam shall make one revolution for every two, three, or four revolutions of the shafts $B^9$ $B^{10}$. The cam $F^2$, preferably, is constructed to move the receiving-block F forward to bring, first, the holes $F^9$ in line with the nail-delivery throats or passages E; second, the nail-receiving holes $F^{10}$ in line therewith, and, third, the holes $F^{11}$ in line therewith, and to then return it to its original position, or to a position to deliver the nails thus being fed to the distributer G.

Of course where the machine embodies mechanism for feeding five wires and making five nails substantially simultaneously from the ends thereof, if it is desired to distribute and drive only five nails at a given time or simultaneously, the nail-receiving block F need not be moved at all. If it is desired to distribute and drive simultaneously ten nails, then each nail-feeding and nail-making device is operated to make and deliver two nails, and the nail-receiving block F is moved by its cam, after receiving the first load of nails, to a position to receive the second load of nails, and is then returned to its original position to deliver the nails simultaneously to the passages of the distributer. If it is desired to distribute and drive fifteen nails, then the nail-receiving block is advanced or moved forward by its operating-cam twice, and the nail-feeding and nail-making devices are caused to make and deliver three nails from each wire.

I would say that for ordinary uses in attaching heel-blanks or loading heel-blanks it will be desirable to use machines either organized to feed and make five nails substantially simultaneously or ten nails substantially simultaneously.

The cam $F^2$ is connected with the receiving-block F by means of the connecting-bar $F^{12}$, which has a cam-pin, $F^{13}$, entering the groove of the cam. I would further say that the cam is constructed so that it moves the receiving-block upon its return movement continuously until its holes are brought in line with the passages of the distributer, and that before the first group of nails is delivered to the holes $F^9$ it is moved slightly forward to bring them in line with the throats or passages E. The nail-receiving holes of the nail-receiving block F must be so divided or arranged that no movement of the block shall bring the holes thereof in register with the throats E more than once. This may be accomplished in a number of ways, and I have shown in Fig. 1 the various holes $F^9$ $F^{10}$ $F^{11}$ arranged at a uniform distance from each other and separated by a space sufficient to permit each nail-receiving hole of the three groups to be moved into register with its respective throat without bringing the first of the group into line with the next throat beyond.

The block F has a perforated hole covering plate, $F^{14}$, which is operated by the stop $F^{15}$, upon the backward movement of the nail-receiving block F, to open the holes, and by the spring $F^{16}$, upon the forward movement of the block F, to close them.

The shafts $B^9$ $B^{10}$, carrying the rolls, are shown geared together at one end, but may be geared together at both ends and at the center of their length, if desired; and one of them carries a pulley and clutch consisting of two members, the driving member of which is adapted to be moved from the driver to stop the operation of the machine. This is accomplished by mounting the driving member upon a yoke-lever, and by connecting the lever with a cam projection upon the cam $F^2$ by means of a bar or projection extending from the lever the cam rotating acts upon the end of the bar, and causes the lever to be pushed or moved outward sufficient to cause the driving member to be moved from the driven member and bring a brake into contact with the driven member.

The distributer comprises the plate G', having perforations $G^2$ to register with the nail-receiving holes of the nail-receiving block F. These holes enter passages in the tubes $G^3$, which are bent or curved to deliver the nails in any desired form or arrangement, and in the drawings I have represented them as extended to the nail-holding block $G^4$. This block has a sliding hole-covering plate, $G^5$, which is adapted to be moved by the nail-carrier H upon its backward movement to uncover the holes of the nail-holding block to permit the nails therein to fall into the holes of the carrier. The carrier is movable by a cam, H', or in any other desirable way, from a position under the nail-holder to a position over the templet $H^2$, and the nails are driven from the templet by a gang or group of drivers, $H^3$, into the heel-blank or work to be loaded.

The nail-making machine is adapted to be set in operation either by hand or automatically, as described in Patent No. 317,199.

It will be observed that by the organization of devices herein specified, or their mechanical equivalents, I am enabled to make and deliver nails very rapidly and surely, and this is one of the principal advantages of the organization, and at the same time there is obtained a very strong and durable construction, one not likely to get out of order, and one that is not submitted to great wear, because each individual nail-feeding and nail-making device is not submitted to hard usage, each nail-feeding and nail-making device making but one, two, three, or four nails at an operation of the machine, instead of a great many, as is necessary in a machine making the nails successively from a single wire.

I prefer that the pointing and severing rolls $B^5$ $B^7$ be so mounted upon their respective shafts as to cause the point-forming dies and nail-severing devices to be actuated in a progressive or successive way, rather than exactly simultaneously, so as to equalize to a greater extent the strain upon the machine. (See Fig. 1.)

Having thus fully described my invention, I claim and desire to secure by Letters Patent of the United States—

1. The combination, in an organized nail making and distributing machine, of devices for feeding a number of wires, devices for simultaneously forming nails from the ends thereof, and the throats or passages E, through which the formed nails are fed, and the movable carrier-block F, substantially as described.

2. The combination, in an organized nail making and distributing machine, of devices for feeding a number of wires, devices for simultaneously forming nails from the ends thereof, and the throats or passages E, through which the formed nails are fed, the movable carrier-block F, and the distributer G, substantially as described.

3. The combination, in an organized nail making and distributing machine, of devices for feeding a number of wires, devices for simultaneously forming nails from the ends thereof, the throats or passages E, through which the formed nails are fed, the movable carrier-block F, the distributer G, and the nail-carrier H, substantially as described.

4. The combination, in an organized nail making and distributing machine, of devices for feeding a number of wires, devices for simultaneously forming nails from the ends thereof, the throats or passages E, through which the formed nails are fed, the movable carrier-block F, the distributer G, the nail-carrier H, and the nail-driving devices, substantially as described.

5. The combination of a series of wire-feeding devices simultaneously or substantially simultaneously actuated, a series of nail-making devices to be simultaneously or substantially simultaneously actuated, the throats E, receiving-block F, and its operating-cam $F^2$, substantially as described.

6. The combination, in a nail-distributing machine, of the block F, having the nail-receiving holes $F^9$, $F^{10}$, and $F^{11}$, and its operating-cam $F^2$, substantially as described.

7. The combination of the series of point-forming and nail-severing rolls $B^5$ $B^7$, their shafts $B^9$ $B^{10}$, the cam-shaft $F^3$, connected with the shaft $B^9$, the cam $F^2$, and a nail-receiving block, F, connected with said cam, substantially as described.

8. The combination of a series of wire-feeding devices adapted to feed a number of wires simultaneously, or substantially so, a series of nail-forming devices adapted to simultaneously or substantially simultaneously form a group of nails from the ends of said wires, a nail-receiving block having holes which receive the formed nails, and a nail-distributer, substantially as described.

9. The combination of the nail-receiving block F, its cam $F^2$, and the nail-distributer G, substantially as described.

10. The series of nail-pointing rolls set upon their respective shafts out of a common horizontal line, whereby they are caused to act progressively or successively, as and for the purposes described.

FREEBORN F. RAYMOND, 2D.

Witnesses:
J. M. DOLAN,
E. P. SMALL.